United States Patent
Bruch et al.

(10) Patent No.: US 6,226,981 B1
(45) Date of Patent: May 8, 2001

(54) AIR TO FUEL RATIO CONTROL FOR GAS ENGINE AND METHOD OF OPERATION

(75) Inventors: Kevin L. Bruch, West Lafayette, IN (US); Peter Neuenschwander, Escholzmatt (CH)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/243,055

(22) Filed: Feb. 2, 1999

(51) Int. Cl.⁷ ....................................... F01N 3/00
(52) U.S. Cl. ................. 60/274; 60/276; 60/285; 60/280; 123/32 EA; 123/478
(58) Field of Search ............... 60/274, 276, 285, 60/280, 278, 297; 123/32 EA, 478; 73/861.42; 250/339, 343

(56) References Cited

U.S. PATENT DOCUMENTS

| | | |
|---|---|---|
| 3,973,529 | 8/1976 | Wessel et al. . |
| 4,141,326 | 2/1979 | Wolber . |
| 4,178,884 | 12/1979 | Norimatsu et al. . |
| 4,319,451 | 3/1982 | Tajima et al. . |
| 4,337,746 | 7/1982 | Masaki . |
| 4,450,814 * | 5/1984 | Sawamoto et al. ............... 123/478 |
| 4,801,805 * | 1/1989 | Butler et al. ..................... 250/343 |
| 4,835,963 * | 6/1989 | Hardy ............................... 60/274 |
| 4,867,127 | 9/1989 | Quirchmayr et al. . |
| 4,953,351 | 9/1990 | Motz et al. . |
| 5,138,163 * | 8/1992 | Butler et al. ..................... 250/339 |
| 5,138,835 * | 8/1992 | Bender et al. ..................... 60/278 |
| 5,158,063 | 10/1992 | Hosoda et al. . |
| 5,329,764 | 7/1994 | Hamburg et al. . |
| 5,528,899 * | 6/1996 | Ono . |
| 5,533,491 | 7/1996 | Gras et al. . |
| 5,837,903 * | 11/1998 | Weigand ......................... 73/861.42 |
| 6,012,284 * | 1/2000 | Tanaka et al. ..................... 60/297 |

OTHER PUBLICATIONS

"Design and Develop. of the Caterpillar 3600 . . . ", by R.D. Nevinger, presented at the Energy–Sources Tech. Conf., New Orleans, Jan. 20–24, 1991.

"Operation of a Caterpillar 3516 . . . ", N.C. Macari et al., Journal of Engineer. for Gas Turbines and Power, Oct. 1987, vol. 109, pp. 443–447.

Caterpillar G3500 High Efficiency Engine Development, by K.L. Bruch presented at ASME Conference, Fall 1995, Milwaukee, WI.

* cited by examiner

Primary Examiner—Thomas Denion
Assistant Examiner—Thai-Ba Trieu
(74) Attorney, Agent, or Firm—Gordon H. Telfer

(57) ABSTRACT

A fuel system for a gas engines has exhaust gas monitors for signals (p, T, V) related to exhaust gas mass flow with an air to fuel controller that acts to adjust the intake of a gaseous fuel, which can vary widely in composition, to maintain a desired level of exhaust gas mass flow.

18 Claims, 1 Drawing Sheet

*Fig. - 1 -*
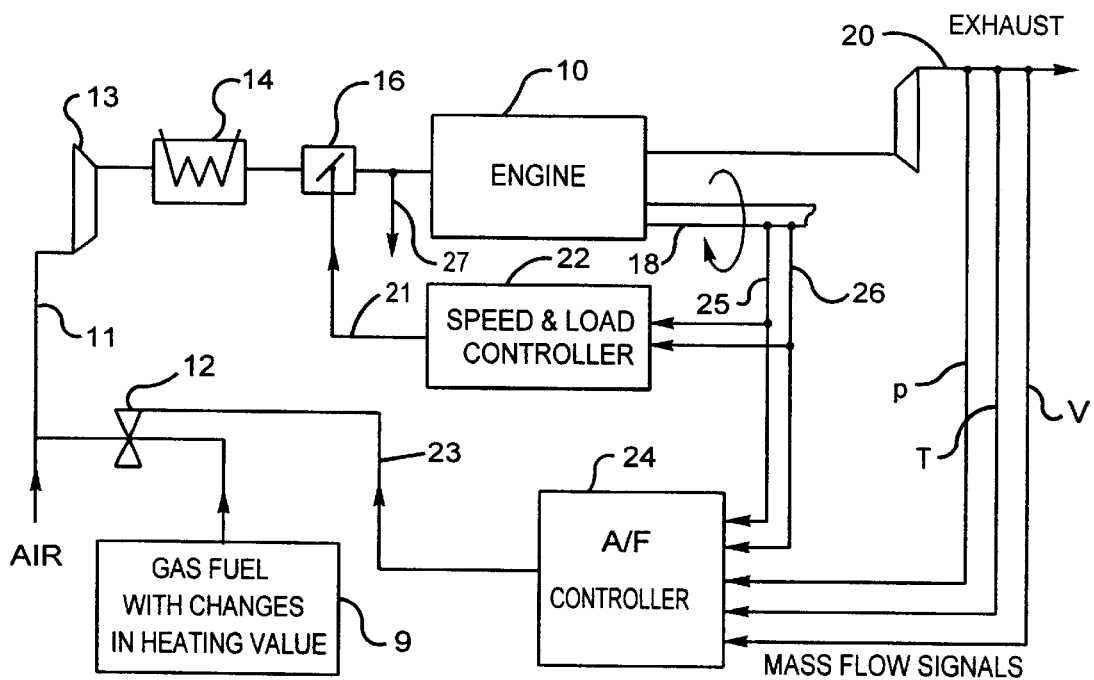
*Fig. - 2 -*
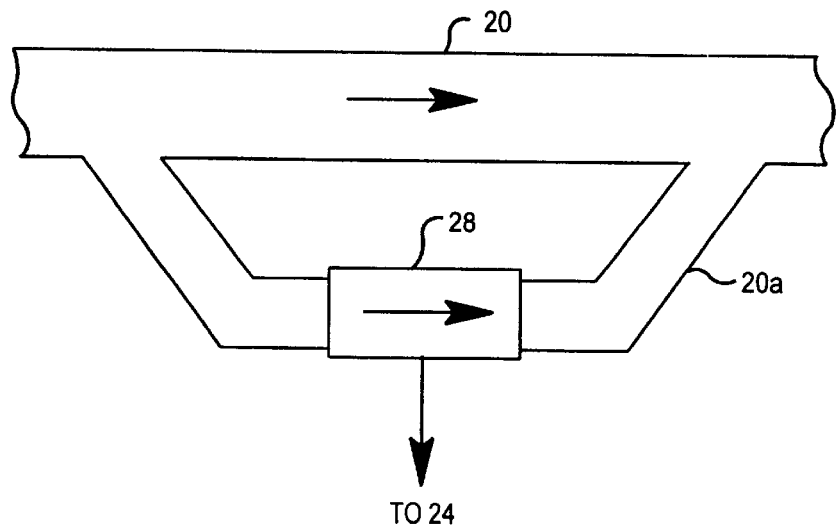

AIR TO FUEL RATIO CONTROL FOR GAS ENGINE AND METHOD OF OPERATION

TECHNICAL FIELD

This invention relates to internal combustion engines and fuel systems therefore, and particularly to an arrangement of apparatus and a method for control of the air to fuel ratio ($\lambda$ or A/F) in engines fueled with a gaseous fuel subject to variation in composition.

BACKGROUND OF THE INVENTION

"Gas" engines in the context of the present description are those designed for operation with a fuel that is gaseous under normal ambient conditions. The fuel can be any of various hydrocarbon gases, carbon monoxide, hydrogen, and mixtures of two or more gases. Such engines are frequently used in stationary applications and use fuel supplies where the composition of the fuel can vary considerably, including landfills and pipelines. Typical engine ratings can be, for example, 50 HP to 5000 HP. The air to fuel ratio of an engine running on a gas fuel is adjusted to load and speed. Where the fuel has a varying composition, its composition and molecular weight are usually not known. Variation in the fuel composition may result in undesirably high NOx emissions.

U.S. Pat. No. 4,867,127, Sep. 19, 1989, proposes a system based on the idea of adjusting the air to fuel ratio $\lambda$ (lamda) based on reading the air and fuel mixture pressure upstream of the inlet valves to the engine. For example, if a constant engine output is required, an increase in that pressure can be caused by an increase in $\lambda$ (or a leaning of the mixture). In such a system, all the relevant input signals for the control of $\lambda$ are sensed on the input side of the engine.

SUMMARY OF THE INVENTION

In accordance with the invention, a fuel system for a gas engine includes an air to fuel ratio controller supplied with input signals from the exhaust so the controller can cause an adjustment in the air to fuel ratio according to the mass flow of exhaust gases. The adjustment can be made by operation of a valve at the fuel inlet before mixing with air. For example, the controller may receive a signal representing mass flow from a hot wire anemometer in the exhaust or a plurality of signals can be supplied to the controller including exhaust gas pressure, and exhaust gas temperature. Volumetric flow of exhaust gas can be measured by a pitot tube. The controller can determine mass flow from the volumetric flow and/or from the measured exhaust gas pressure and temperature. Preferably, there is a signal also for the temperature of the inlet mixture of air and fuel so the controller can take variations in such temperature into account.

In practice of the invention, the described A/F control may be one loop (e.g., the outer loop) of a two loop control circuit. The other (inner) loop would normally be for load and speed control affecting actuators such as a throttle valve or a waste gate. Two loop control systems have been previously used but not with the A/F ratio control based on exhaust gas mass flow, particularly for running on fuels of varying composition.

A variety of different sensors may be employed but it is not necessary to monitor the chemical composition of the exhaust gases directly. The apparatus and method of the invention may be used alone or, if desired, in concert with other methods of NOx estimation or air to fuel control or as a reasonableness check or back up method.

For example, in some prior engine fuel systems, an oxygen (O2) sensor was used in the exhaust to provide readings for accurate adjustment of the A/F ratio. Use of such O2 sensors can provide safe operation of a gas fueled, lean burn engine with low NOx emission. However, if an O2 sensor failure occurs, an engine may have to be shut down. But now, with the present invention, highly reliable sensors can be used to control the A/F ratio according to exhaust gas flow, either by itself or in conjunction with, or as a back up to, control with an O2 sensor (or other sensor of exhaust composition).

Molecular weight differences of various fuels cause smaller differences in the exhaust than in the intake fuel mixture which is an advantage for more precise control.

The invention can be especially suited for use when it is considered desirable to have air to fuel controlled according to the exhaust mass flow. The exhaust mass flow is in direct relation to emissions, at a given load and speed. The present technique is a highly accurate NOx control technique but without a need for having a NOx sensor (or other gas composition analyzer) in the exhaust, which would incur substantially greater cost.

These and other aspects of the inventive apparatus and method will become more apparent from the following description.

BRIEF DESCRIPTION OF THE DRAWINGS

FIG. 1 is a schematic block diagram of an engine and fuel system in accordance with an example of the present invention; and FIG. 2 is a schematic diagram of a portion of a system such as that of FIG. 1.

DESCRIPTION OF THE PREFERRED EMBODIMENTS

Before getting into more specific description of embodiments of the invention, some general description of the principle of using exhaust mass flow for controlling the A/F ratio will be given. Experience shows that a constant intake manifold pressure correlates to a constant level of NOx emission for a certain load and speed, even if the heating value of the fuel changes. This can be explained as follows:

NOx formation is determined mainly by temperature, pressure and residence time. For a certain speed and timing the residence time is virtually constant. To get the obtained torque, a certain pressure has to be achieved. Therefore only the temperature can vary and influence the NOx formation. The variable which influences the temperature is the amount of a gas or the number of molecules in the cylinder. With more molecules, a lower temperature is necessary for the same pressure and vice versa. This means that we want to control the molecular flow of the fuel and air mixture to the cylinder, besides the charge temperature at the beginning of the compression. If the heating value of the fuel increases, a smaller amount of fuel is necessary to get the same power. The lack of molecules because of the reduced fuel mass flow is roughly compensated by an increased air flow.

The intake manifold pressure is related to the molecular flow of the mixture. This explains the experimental experience of intake manifold pressure as a main indicator of NOx formation. If the molecular weight M of the mixture gas is changing due to a changing heating value of the fuel, the molecular flow n and the mass flow m respectively are changing as follows (speed, load, intake manifold pressure and temperature constant):

$$n \sim \frac{1}{\sqrt{M}} \quad \text{and} \quad m \sim \sqrt{M}$$

If the differential pressure of the mixture gas or exhaust gas flow are measured with a Pitot static tube, the same relationships are valid.

To check the influence of changing fuel, 100% methane and 100% propane were compared. To keep the energy (number of BTU) in the cylinder constant, the amount of methane molecules required is 2.6 times the amount of propane molecules. To keep the total amount of molecules constant, a specific air to fuel ratio ($\lambda$) stays for methane and propane nearly the same. The molecular weight of $\lambda=2$ air to methane mixture is 27.9 kg/kmol and for a $\lambda=2.14$ air to propane mixture it is 28.9 kg/kmol. The change in molecular weight changes the mass or molecular flow only by 1.8% for this extreme example, if intake manifold pressure and temperature are held constant (Pitot static tube: constant differential pressure, absolute gas pressure and gas temperature). The molecular weight of the exhaust gas is 28.3 kg/kmol for methane fuel and 28.7 kg/kmol for propane fuel. For the same arrangement the A/F ratios (mass) are also similar for both fuels.

For a fuel with 50% methane and 50% carbon dioxide the air fuel mixture will have a molecular weight of 28.8 kg/kmol and exhaust gas will have a molecular weight of 29.1 kg/kmol. The specific air to fuel ratio will be 1.9. The A/F ratios (mass) will decrease to a fourth of the value of the methane or propane fuel.

The mass flow of the mixture gas and the exhaust gas are equal. The molecular flows are not. The more the weight of the fuel molecules differ from air and the richer the mixture, the larger the difference in the molecular flow. Because the number of molecules change during combustion, it is not obvious whether the mixture molecular flow or the exhaust molecular flow matches the lean condition in the cylinder better. At least for the above examples differences in molecular weight of mixture gas and exhaust gas can be neglected.

Other hydrocarbon gases, including ethane, ethylene, propane, propylene, isobutanes, norbutane, isopentane, norpentane, neopentane, hexane, heptane, octane, and nonane are suitable for gas fueled engines, as well as carbon monoxide and hydrogen, and mixtures (or blends) of the various gases. In applications of particular interest, the composition of the fuel varies frequently and by a significant mangitude. For example, the heating value can vary by a wide margin, such as 120 BTU/ft3 for H2 to 2365 BTU/ft3 for propane. The compositions encountered can also be contrasted by a methane number representing the relative detonation tendency of the fuel to that of methane. Engines of interest run on fuels with methane numbers ranging from 20–150. The present invention is particularly advantageous in engine fuel systems with a fuel supply susceptible to such variations or even variations of a factor of two, or lesser but still appreciable variations, in such qualities as the heating value or the relative detonation tendency.

Of the various gases and mixtures of gases, along with methane and propane, differences in molecular weight of the gas are smaller than 5% compared to methane as a reference (except hydrogen which is about 15% less than methane). For exhaust gas changes smaller than 2% (except for carbon monoxide with a 10% difference and hydrogen at –6%), if the air to fuel ratio is controlled by measuring e.g. intake manifold pressure or mixture gas flow with a Pitot static tube, the systematic error in flow is smaller than 2.5% for all these extreme examples (except hydrogen 7.6%). If the exhaust gas flow is measured rather than mixture gas flow, deviations are smaller than 1.1% (except of carbon monoxide with 4.7% and hydrogen with 2.9%).

The foregoing analysis supports the idea that mass flow measuring is a good way to keep the combustion temperature constant and mass flow measuring of exhaust gases provides an opportunity for precise measurements.

In this discussion the impact of changing heat capacity of the charge because of changing composition of fuel, A/F ratio and humidity is ignored as being of secondary importance.

With constant speed, load and timing we want to take the heating value of the fuel and the initial temperature of the charge as independent variables into consideration to reach the temperature goal.

FIG. 1 shows a general schematic of an example of an engine and fuel system in accordance with the invention. Gas fueled engine 10 is supplied a mixture of air (A) and fuel (F), through a usual arrangement including a mixture conduit 11 and a fuel flow valve 12, a compressor 13, a cooler 14 and a throttle valve 16. The fuel, from a supply 9, may be a gaseous fuel such as one previously described that is not reliably of a fixed composition, such as one that varies appreciably in its heating value or relative detonation tendency. The engine 10 can itself be a conventional gas fuel engine in accordance with prior practice. From combustion of the fuel in the engine 10, mechanical power is developed on a shaft 18 and exhaust gases pass out through an exhaust conduit 20.

Two control loops are included in FIG. 1. A first loop 21 includes a speed and load controller 22 that gets speed and load signals 25 and 26 from the engine output shaft 18. A second loop 23 has an A/F controller 24 to reach the molecular flow goal or mass flow goal. The speed-load loop 21 has the throttle valve 16, an exhaust bypass (not shown) or a variable geometry turbocharger, as actuator. The flow loop 23 has the fuel flow valve 12 as actuator. The nominal value of the flow is stored in the controller 22 as a function of speed and load 25 and 26. In addition the stored value is corrected depending upon the initial temperature of the charge. This initial temperature depends on intake manifold temperature, on jacket water temperature, on the residual mass and on the temperature of the residual mass. Line 27 represents a signal line for the temperature of the fuel mixture entering the engine 10; signals on line 27 may be supplied to the controllers 22 and/or 24. The residual mass is basically very small for gas engines and it will be nearly constant for a certain speed, load and exhaust flow (the exhaust flow is controlled by the second control loop). Only the combination of very low load and low speed can increase the residual mass significantly. Because of this, it is not necessary to take the residual mass and its temperature into consideration for the usual engine envelope. But the intake manifold and jacket water temperatures are monitored to adjust the flow map.

If pressure measurement is used for flow determination, compensation of temperature impact can be made based on the ideal gas law with the exhaust gas temperature as follows (mixture temperature if the mixture flow is measured):

$$C = C_{ref} T / T_{ref}$$

This model approach takes the change in gas density related to the velocity or pressure measurement into consideration. It does not compensate the higher amount of internal energy which is brought in the cylinder with a hotter mixture gas due to higher intake manifold temperature or higher jacket water temperature. This effect can be compensated with more detailed modeling or mapping.

In the example of FIG. 1, the A/F controller 24 is supplied signals about the exhaust gases from the exhaust conduit 20, for example a signal p representing the exhaust gas pressure, a signal T representing the exhaust gas temperature, and a signal V representing the exhaust gas volumetric flow. Not necessarily all three signals p, T and V need be supplied to controller 24; signal V can be sufficient or else signals p and T.

Determination of conditions of the exhaust, for control of mass flow, is at least as effective in principle as determining conditions of the intake fuel mixture and has the advantage of smaller differences in molecular weight for different fuels (except for CO) compared to intake fuel mixtures.

It is recognized that sensors for monitoring the exhaust gases should be sturdy to stand up to the exhaust gas temperatures and corrosive or particulate composition.

Volumetric flow or speed respectively can be measured with a diaphragm, Venturi nozzle, Pitot static tube (Prandtl tube), hot wire anonometer, etc. To reduce costs, existing mass flow measurement devices from the automotive industry are a good choice for use in engine systems. Because cars have much smaller engines than industrial gas engines, the whole mass flow cannot be measured with such sensors. This difficulty can be solved with an arrangement of a bypass tube and calibration of the system. Automotive engines generally do not run on any gaseous fuel and when they do (liquefied natural gas, for example) the fuel has a reliably consistent composition. However, some sensor technology developed in the automotive field for various purposes not having to do with either the present invention or gas fuels of varying composition may be usefully applied here. If cheap automotive sensors show a lack of reliability under gas engine operation conditions, multiple sensors can be used for redundancy.

FIG. 2 illustrates a portion of the exhaust conduit 20. Since the engine may be quite large, e.g., up to about 5000 HP, exhaust flows are also quite large. Here, a part of conduit 20 has a bypass, or a parallel loop, 20a with a smaller cross-section than conduit 20. A flow measurement device 28, such as one of the types mentioned above, is disposed in the bypass 20a so it can be selected from those that are suitably reliable but intended to operate over a range of volumes less than that encountered in the conduit 20.

In the exhaust stream more indirect measurements for determining mass flow are suitable also in some applications:

Exhaust manifold pressure

Turbo-charger speed combined with load and speed of the engine

Exhaust pressure before and after a turbo charger combined with load and speed of the engine.

All these indirect methods on the exhaust side depend on the single engine—turbo charger, inter-cooler, exhaust stack configuration. Over time, operating conditions are affected by reduced performance of the turbo charger because of abrasion and fouling of the turbine and compressor wheels or because of increased friction of the bearings. Additionally, fouling of the air filter and inter cooler or increased back pressure of the exhaust pipe change operating conditions also. These indirect measurement techniques are normally, therefore, less preferred than the direct measurements discussed in connection with FIG. 1.

The controllers 22 and 24 may be basically in accordance with existing state of the art engine controllers, particularly electronic control modules that are set or programmed to respond to predetermined conditions among the monitored parameters to exercise a predetermined control function.

Industrial Applicability

The system and method of operation described allow wide variations in fuel composition without appreciable affect on NOx emissions. Further, the invention can be implemented using existing sensor and controller technology but applied to the particular conditions of gas engines. Therefore, gas engines may be located in more places, including locations where emissions are particularly important, and operate on a wide range of fuels.

It will be apparent that numerous variations can be made from the specific examples described above in keeping with the spirit and scope of the invention.

What is claimed is:

1. A fuel system of an internal combustion engine having an intake for an air and fuel mixture and having an exhaust for gaseous products from the engine, comprising:
   a mechanism to vary the air to fuel ratio of the mixture; and
   an air to fuel ratio controller with one or more input signals from the exhaust of the engine that vary in accordance with a variation in mass flow of exhaust gases, said controller being arranged to process said input signals and to produce an output adjustment signal applied to said mechanism to adjust the air to fuel ratio at the engine intake as a function of the variation in mass flow of exhaust gases without any input signal from an exhaust gas oxygen sensor.

2. The system of claim 1 wherein:
   the air to fuel ratio controller receives among said input signals a first signal representing exhaust gas pressure and a second signal representing exhaust gas temperature.

3. The system of claim 1 wherein:
   the air to fuel ratio controller receives among said input signals a signal representing volumetric flow of exhaust gas.

4. The system of claim 1 wherein:
   the air to fuel ratio controller receives additional input signals including an air and fuel intake temperature signal and engine speed and load signals.

5. The system of claim 3 wherein:
   the engine exhaust comprises a primary conduit of exhaust gas and a bypass conduit of exhaust gas, having smaller cross-section, in parallel with a portion of the primary conduit; and
   a flow measurement device for generating said signal representing volumetric flow is located in the bypass conduit.

6. The system of claim 1 where:
   the controller input signals from the exhaust include a signal from apparatus selected from the group consisting of a diaphragm, a Venturi nozzle, a Pitot static tube, a Prandtl tube, and a hot wire anemometer.

7. The system of claim 1 where:
   the controller input signals from the exhaust include a signal representing mass flow from a hot wire anemometer.

8. A method of operating a fuel system of an engine comprising the steps of:
   feeding an air and fuel mixture to the engine intake with an adjustable mechanism to adjust the air to fuel ratio of the mixture;
   reading one or more signals from the engine exhaust relating to mass flow of the engine exhaust gases without reading any input signal from an exhaust gas oxygen sensor;

comparing exhaust gas mass flow signals to a predetermined range of values; and adjusting air to fuel ratio to bring the exhaust gas mass flow to within said predetermined range of values.

9. The method of claim 8 wherein:

the comparing step is performed with allowance for variation in the temperature of the air and fuel mixture.

10. The method of claim 8 wherein:

the reading step includes reading exhaust gas pressure and exhaust gas temperature.

11. The method of claim 8 wherein:

the reading step includes reading exhaust gas flow volume.

12. The method of claim 8 wherein:

the comparing step is performed by an air to fuel ratio controller that receives and processes said signals from the exhaust along with a signal representing air and fuel mixture temperature and signals representing engine speed and load.

13. An engine system comprising:

an internal combustion engine having an air and fuel mixture intake and an exhaust for gaseous products from the engine;

a fuel source connected to the intake with a fuel that is gaseous and is susceptible to variation in composition;

a mechanism to vary the air to fuel ratio of the mixture to the intake;

one or more sensors in the exhaust to develop respective one or more signals that vary in accordance with a variation in mass flow of exhaust gases, said exhaust sensors including sensors selected from the group consisting of a sensor of volumetric flow of exhaust gas and a pair of sensors respectively of exhaust gas pressure and exhaust gas temperature;

an intake air and fuel temperature sensor sensing the temperature of the air and fuel mixture to the engine; and, an air to fuel ratio controller supplied with the signals from the exhaust sensors and the intake air and fuel temperature sensor and producing an output air to fuel ratio adjustment signal to the mechanism to vary the air to fuel ratio.

14. The system of claim 13 where:

the fuel source supplies a fuel with a variation in composition that has an appreciable variation of heating value and of relative detonation tendency.

15. The system of claim 13 including:

a speed and load controller connected to receive speed and load signals from an engine output shaft and to develop a speed-load output signal, and the engine system also includes a throttle valve for varying the amount of air and fuel mixture to the engine, said throttle valve being connected with the speed and load controller to be responsive to the speed-load output signal.

16. The system of claim 14 where:

the engine is a stationary engine having a rating in the range of from 50 HP to 5000 HP; and, the fuel source includes a source selected from the group consisting of landfills and pipelines.

17. The system of claim 13 where:

The controller is arranged to produce the output air to fuel ratio adjustment signal based on the signals that vary in accordance with a variation in mass flow of exhaust gases independent of any signal of exhaust gas chemical composition.

18. The system of claim 17 where:

the exhaust has no sensor of exhaust gas chemical composition.

* * * * *